United States Patent [19]

Grünsch et al.

[11] 4,352,054
[45] Sep. 28, 1982

[54] METHOD FOR ACTUATING A SWITCHING TRANSISTOR OPERATING AS A SETTING MEMBER IN A DC/DC CONVERTER

[75] Inventors: Eckhardt Grünsch, Allmersbach; Günter Wochele, Oppenweiler, both of Fed. Rep. of Germany

[73] Assignee: Licentia Patent-Verwaltungs-G.m.b.H., Frankfurt am Main, Fed. Rep. of Germany

[21] Appl. No.: 240,545

[22] Filed: Mar. 4, 1981

[30] Foreign Application Priority Data

Mar. 7, 1980 [DE] Fed. Rep. of Germany ....... 3008716

[51] Int. Cl.³ .................... G05F 1/56; H02M 3/335
[52] U.S. Cl. .................. 323/224; 323/283; 323/289; 323/290; 363/21
[58] Field of Search ............ 307/296 A, 297; 323/224, 282, 283, 289, 290; 363/21, 97, 124

[56] References Cited

U.S. PATENT DOCUMENTS

| | | | |
|---|---|---|---|
| 4,034,281 | 7/1977 | Morita et al. | 363/124 X |
| 4,187,458 | 2/1980 | Milberger et al. | 323/290 X |

FOREIGN PATENT DOCUMENTS

| | | |
|---|---|---|
| 2014218 | 3/1978 | Fed. Rep. of Germany. |
| 2839019 | 3/1980 | Fed. Rep. of Germany ...... 323/290 |
| 475608 | 9/1975 | U.S.S.R. ............................ 323/290 |

OTHER PUBLICATIONS

Wüstehube, "Schaltnetzteile", Band 33 Kontakt & Studium, Elektronik, 1979, p. 81, ISBN 3-88508-601-8.

*Primary Examiner*—A. D. Pellinen
*Attorney, Agent, or Firm*—Spencer & Kaye

[57] ABSTRACT

A dc/dc converter for controlling the current through a load which comprises a switching transistor having its emitter-collector circuit coupled between an input voltage source and the load. A control transformer having first, second and third electromagnetically coupled windings is also provided, the second winding of the transformer being electrically connected between the base and emitter of the switching transistor. A control switching logic circuit selectively generates pulses for determining the beginning and the end of the conducting period of the switching transistor, and a control circuit coupled to the logic circuit selectively short circuits the third winding thereby reducing the voltage across the second winding and driving the switching transistor into its non-conducting state. A charging control circuit selectively energizes the first winding from the input voltage source and disconnects this winding from the source when sufficient energy has been stored in the core of the transformer to actuate the switching transistor.

4 Claims, 6 Drawing Figures

METHOD FOR ACTUATING A SWITCHING TRANSISTOR OPERATING AS A SETTING MEMBER IN A DC/DC CONVERTER

BACKGROUND OF THE INVENTION

The present invention relates to a dc/dc converter and, in particular, to a method and apparatus for controlling the current transmitted to a load through a switching transistor comprising a part of the converter.

Switching transistors employed in dc/dc converters can be actuated in various ways, a transformer often being used if it is desired to keep the actuating power as low as possible. As an example, German Pat. No. 2,014,218 discloses a circuit for controlling the current through a switching transistor wherein current flow is initiated by a control transformer. In this prior art circuit, turn-on pulses of a first polarity are generated by a clock pulse generator, and the base current of the switching transistor is provided by positive feedback of the load current to the control circuit. The clock pulse generator terminates current through the switching transistor by means of a short pulse of opposite polarity. A disadvantage of this circuit is that the current flowing in the base circuit is too high for some applications. Moreover, it is difficult to control the circuit with external signals and parameters such as, for example, the voltage across the load resistance.

It is therefore an object of the present invention to provide a method and apparatus for actuating a switching transistor wherein the power loss is low and the current through the load is easily and quickly controlled by external control signals.

SUMMARY OF THE INVENTION

In accordance with the present invention, a dc/dc converter for controlling the current through a load is provided which comprises a switching transistor having its emitter-collector circuit coupled between an input voltage source and the load. A control transformer having first, second and third electromagnetically coupled windings is also provided, the second winding of the transformer being electrically connected between the base and emitter of the switching transistor. A control switching logic circuit actuated by a clock pulse generator selectively generates pulses for determining the beginning and the end of the conducting period of the switching transistor, and a control circuit coupled to the logic circuit selectively short circuits the third winding thereby reducing the voltage across the second winding and driving the switching transistor into its non-conducting state. A charging control circuit selectively energizes the first winding from the input voltage source and disconnects this winding from the source when sufficient energy has been stored in the core of the transformer to actuate the switching transistor.

That is, when the switching transistor is in its non-conducting or blocked state, the current through the first winding of the transformer is switched off as soon as it reaches the necessary energy for subsequently actuating the switching transistor. The received energy is stored by short-circuiting the third winding until the switching transistor is switched on. The short circuit is produced by a control stage and, after the short circuit is disconnected in response to a signal from the control switching logic circuit, the stored energy of the transformer is transmitted to the second winding causing the switching transistor to switch to its conducting state.

It is particularly advantageous to feed to the control switching logic circuit a value proportional to the output voltage as the switching criterion. This permits the dc converter to quickly respond to changes in load by varying the width of the clock pulse furnished by the clock pulse generator.

If the current to the first winding is switched on only upon the occurrence of a pulse furnished by the control switching logic circuit, a noise pulse generated by parasitic capacitances or the transformed carrier sweep-out current of the switching transistor will not have an adverse effect on the current supplied to the first winding. If a pulse is furnished from the control switching logic circuit or from the clock pulse generator at least one-half period after the switching transistor becomes conductive, the energy losses are reduced even further. The energy stored in the core of the transformer will decay to a lesser degree because of the shorter energy storage period.

Figure 4:
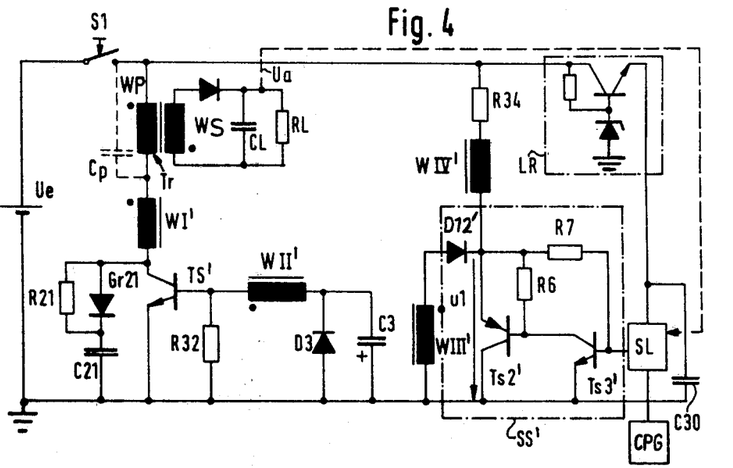
FIG. 4 is a modified circuit employing transformer feedback.

The circuit shown in FIG. 4 is particularly suitable for preventing actuation of the switching transistor when the supply voltage of the control logic circuit is missing or is too low. In this circuit, a noise pulse is formed by parasitic capacitances in the first winding which serves to provide feedback when a switch which connects the input voltage source with the dc/dc converter is closed. This noise pulse generates at the second winding a voltage which is insufficient to switch the switching transistor into its conducting state.

DESCRIPTION OF THE PREFERRED EMBODIMENTS

Figure 1:
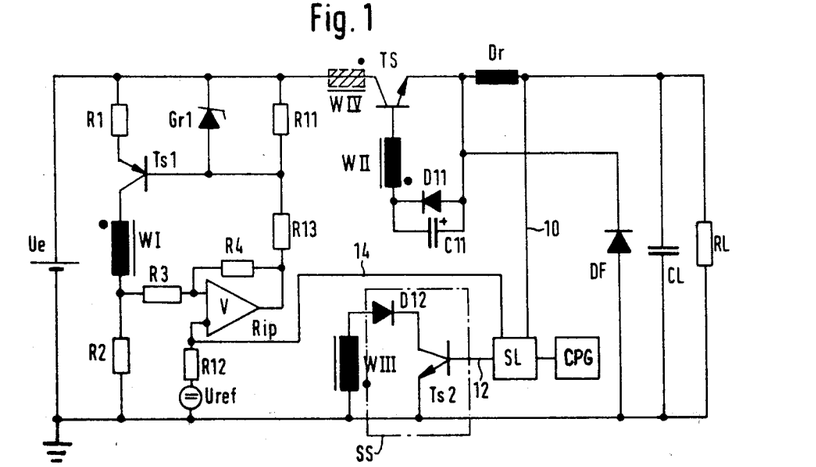
FIG. 1 shows a circuit according to the invention.

Referring to FIG. 1, a resistor R1, the collector-emitter path of a first transistor Ts1, a first or primary winding WI of a control transformer and a current measuring resistance R2 are connected across an input voltage source Ue. A Zener diode Gr1 and a resistor R11 are connected in parallel with the base-emitter path of transistor Ts1 to form a constant current source.

A switching transistor TS has its collector and emitter electrodes connected between the positive terminal of the input voltage source Ue and one end of a load resistance RL through a smoothing choke Dr. A charging capacitor CL is connected in parallel with the load resistor RL, the negative terminal of the voltage source UE being grounded and connected to the other end of the load resistor. A diode DF is poled to conduct current from ground to the junction of choke Dr and the emitter of switching transistor TS.

The junction of the primary winding WI of the control transformer and resistor R2 is coupled through a resistor R3 to the non-inverting input of a bistable comparison amplifier V having a resistor R4 connected between its output and non-inverting input. A resistor R13 couples the output of the amplifier to the base of transistor Ts1, and the inverting input of amplifier V is coupled to ground through a resistor R12 and a reference voltage source $V_{ref}$.

The base of the switching transistor TS is coupled to its emitter by a series circuit including a second winding WII and the parallel connection of a discharging capacitor C11 and diode D11 poled to conduct current from the emitter to the base of transistor TS. Capacitor C11 and diode D11 remove charge carriers from the switching transistor TS during its blocking phase.

A clock pulse generator CPG is coupled to a control switching logic circuit SL for generating control pulses which cause the switching transistor TS to begin and end conduction. Operation of the dc/dc converter in a regulated manner is effected by varying the duration of the clock pulses generated by clock pulse generator TG by means of the logic circuit SL.

The logic circuit SL is connected by a lead 10 to the junction of the output resistor RL and choke Dr, to the base of a transistor Ts2 by a lead 12 and to the inverting input of bistable comparison amplifier V by a lead 14. The collector of transistor Ts2 is coupled to a series connection of a third winding WIII of the control transformer and a diode D12 poled to conduct current toward the collector of transistor Ts2. The emitter of transistor Ts2 and one end of winding WIII are grounded, transistor Ts2 and diode D12 comprising a control stage SS for controlling winding WIII. The relative polarities of the first, second and third transformer windings, which are electromagnetically coupled, are shown by dots at one end of each winding and, in a typical circuit, the ratios of the turns of windings WI, WII and WIII are 116:44:465 respectively.

Figure 5:
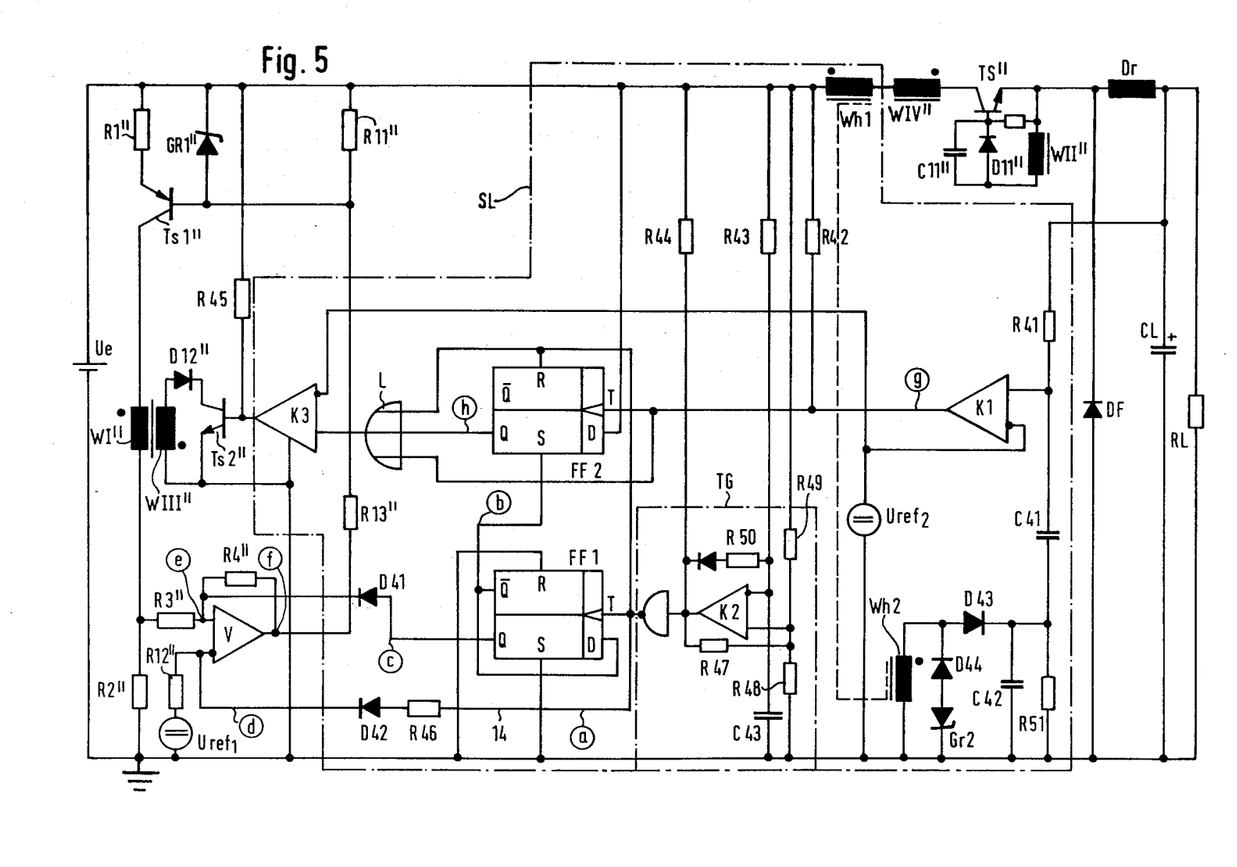
FIG. 5 shows a detailed control circuit diagram employed in the invention.

The output voltage is preferably used as the switching criterion. A circuit for actuating the control stage SS and the non-inverting input of amplifier V from the output voltage, clock pulse generator CPG and control switching logic circuit SL will be described in more detail in connection with FIGS. 5 and 6. The clock pulse generator CPG comprises an RC-generator which produces current pulses. The control switching logic circuit SL comprises a pulse-width modulator, which is controlled by the output voltage and a signal proportional to the collector current of the switching transistor TS, and logical circuit elements. All circuitry details of the clock pulse generator CPG and the switching logic circuit SL are shown in FIG. 5, the functions of the elements shown in FIG. 5 being illustrated by means of the waveform diagrams of FIG. 6.

Figure 2:
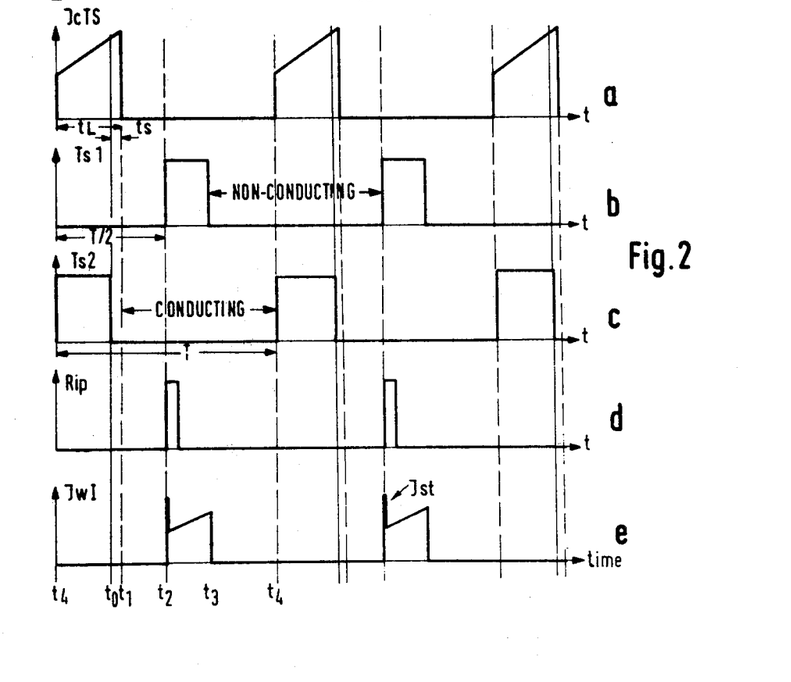
FIGS. 2 and 3 show current waveforms for the circuit of FIG. 1.

The operation of the circuit of FIG. 1 is as follows. Referring to FIG. 2, it is assumed that the circuit has been operating in its steady-state condition with a period T and that the time is just prior to $t_o$. At this instant, current flows through the emitter-collector path of switching transistor TS to the load RL, and transistors Ts1 and Ts2 are in their non-conductive or blocked states. At the instant $t_o$, a signal is applied to the base of transistor Ts2 by the logic circuit SL and transistor Ts2 becomes conductive, as shown in FIG. 2c, thereby short circuiting transformer winding WIII through the diode D12. The shorting of winding WIII causes the voltage across winding WII in the base circuit of transistor TS to be reduced resulting in switching transistor TS stopping conduction at time $t_2$ after an interval ts. This is shown in the waveform diagram of FIG. 2a illustrating the emitter-collector current through the switching transistor TS. Once transistor Ts2 becomes conductive, the only current flowing through winding WIII, diode D12 and the collector-emitter path of transistor Ts2 of the control stage SS results from the remaining energy stored in the transformer core.

If now a pulse Rip (FIG. 2d) is generated by the logic circuit SL at the inverting input of the bistable comparison amplifier V, a voltage is produced at the output of the amplifier which causes transistor Ts1 to be switched into its conductive state. A current JWI (FIG. 2e) then flows from input voltage source Ue through resistor R1, the emitter-collector path of transistor Ts1, the primary winding WI and resistor R2. The current flow JWI causes energy to be stored in the transformer core via the primary winding WI and produces a voltage across resistor R2. The circuit parameters are such that, after reaching the energy required to actuate the switching transistor TS, the potential across the non-inverting input of the bistable comparison amplifier V is higher than the potential provided by the reference voltage Uref at the inverting input. The output of the bistable comparison amplifier V is, therefore, at a high potential with respect to ground and is retained in this state by resistors R3 and R4. Consequently, transistor Ts1 no longer receives base current and becomes non-conductive at time $t_3$, as shown in FIGS. 2b and 2e.

Since the winding WIII is short-circuited by transistor Ts2, almost no losses occur in this circuit and the received energy is stored and decays only slightly in the interval $t_1$ to $t_4$ until, at time $t_4$, the switching transistor TS is switched on. The transformation ratio of windings WIII to WII is selected to be large enough so that the voltage induced in winding WII is not sufficient when winding WIII is short-circuited to actuate the switching transistor TS.

In order to switch transistor TS back into conduction, a signal is applied at time $t_4$ to the base of transistor Ts2 from the logic circuit SL which removes the short circuit from winding WIII. The higher voltage now present across winding WIII is induced in winding WII and results in the switching transistor TS being actuated. The transformer stores sufficient energy during the interval $t_2 - t_3$ to keep the switching transistor TS conductive during its entire conductive phase, $t_4 - t_1 = t_L$. Since the current through the winding WII is relatively small due to the transformation ratio, the power loss is relatively low during the interval $t_4 - t_o$ when transistor Ts2 is conductive. No energy can be returned to winding WI since transistor Ts1 is in the blocked state during the interval $t_3 - t_4$.

It is advantageous to generate the reset pulse Rip (FIG. 2d) after the interval T/2 at time $t_2$ substantially midway between the turn-on at times $t_4$ of the switching transistor TS. The winding WI receives current then only during the second half of the blocking phase of the switching transistor TS from the current JWI (FIG. 2e) and there is a relatively short time in which the transformer can lose stored energy.

Figure 3:
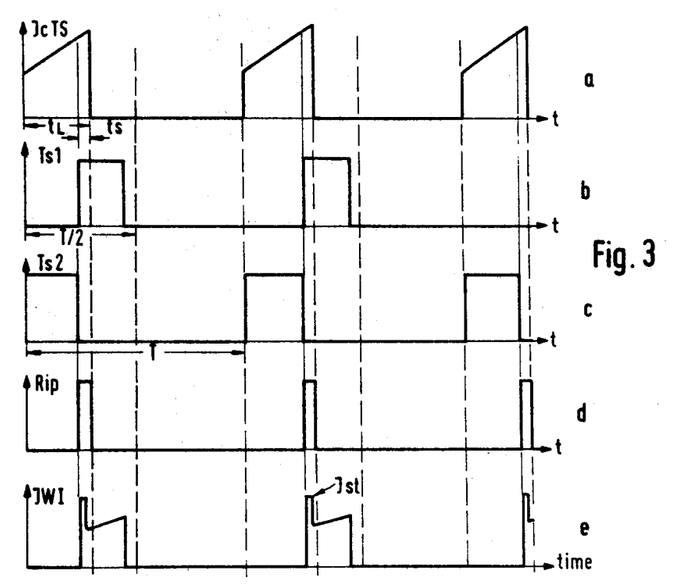

FIG. 3 illustrates operation of the circuit when the reset pulse Rip is generated precisely during the turnoff time ts of switching transistor TS when the comparison amplifier V is still blocked. Since the amplifier is blocked it cannot respond to a noise pulse Jst when no energy is being received. After the switching transistor TS has been turned off, the reset pulse Rip goes from a high potential to a low potential and thus the inverting input of the bistable comparison amplifier V is connected, via resistor R12, only with the reference voltage Uref.

Comparing the diagrams of FIG. 2 and FIG. 3 it is obvious that the reset pulses Rip are generated at different times. In FIG. 2d the reset pulse Rip causes energy storing by means of winding WI only during the second half of the blocking phase. The operating mode shown in FIG. 2 therefore produces smaller energy losses than the mode of operation shown in FIG. 3. In FIG. 3, however, the reset pulse Rip may be supplied by a pulse-width modulator, which is part of the control switching logic circuit SL, thereby leading to a simplification of the control switching logic circuit SL shown in FIG. 5.

In order to prevent the current in the winding WI of the transformer from rising to too high a value during removal of the charge carriers from the base-emitter zone of the switching transistor TS, the current is limited in the current limiting circuit comprising resistor R1, zener diode Gr1 and transistor Ts1.

In FIG. 1 an alternative method of supplying the main part of the base current of switching transistor TS is also shown. The energy stored in the transformer core causes a current to flow through winding WII which is sufficient to actuate the switching transistor TS when winding WIII is not short-circuited. A current IcTS flows through winding WIV, which is connected in series with the emitter-collector path of switching transistor TS. As winding WIV is electromagnetically coupled to winding WII, there is a feedback from the emitter-collector circuit to the base circuit of switching transistor TS. Due to this feedback the main part of the base current is supplied by the currrent IcTS and only a minor part is obtained from the stored energy in the core of the transformer.

Typical circuit values for the dc/dc converter of FIG. 1 are as follows:

| R1 | = 16 Ω | R2 | = 16 Ω | R3 | = 51 KΩ |
|---|---|---|---|---|---|
| R4 | = 270 KΩ | R11 | = 4.3 KΩ | R12 | = 10 KΩ |
| R13 | = 4.3 KΩ | C11 | = 47 μF | CL | = 3300 μF |
| Gr1 | = ZD 3.6 V | Ue | = 12 V | Uref | = 0.7 V |
| WI | = 116 turns | WII | = 44 turns | WIII | = 465 turns |
| WIV | = 4 turns. | | | | |

A modified circuit arrangement according to the invention which also employs transformer feedback is shown in FIG. 4. In this circuit, the switching transistor TS' has its emitter-collector path coupled across a voltage source Ue through a first winding WI' of a control transformer, the primary winding WP of a power transformer Tr, which also has a secondary winding WS, and a switch S1, one pole of switch S1 being connected to the positive terminal of voltage source Ue. A loss regulator LR and a capacitor C30 are connected through switch S1 across the voltage source Ue. A resistor R21 and dioe Gr21 each have one end connected to the junction of the collector of transistor TS' and the winding WI', the other ends of resistor R21 and diode Gr21 being coupled through a capacitor C21 to the grounded terminal of the voltage source Ue.

The base of switching transistor TS' is coupled through a resistor R32 to ground, and also to ground through a winding WII' of the control transformer and a parallel circuit consisting of a capacitor C3 and a diode D3.

A transistor Ts2' has its collector grounded and its emitter coupled through a fourth winding WIV' of the control transformer, a resistor R34 and switch S1 across the voltage source Ue. A third winding WIII' of the control transformer is connected through a diode D12' across the emitter-collector path of transistor Ts2', and the base of transistor Ts2' is connected to the collector of a transistor Ts3' having a grounded emitter. A resistor R6 is connected between the emitter of transistor Ts2' and its base and a resistor R7 is connected between the emitter of transistor Ts2' and the base of transistor Ts3'.

A clock pulse generator CPG is connected to a control logic circuit SL which in turn is connected to the junction of the regulator LR and capacitor C30. The output of logic circuit SL is coupled to the base of transistor Ts3'.

The operation of this circuit is as follows.

When the control transistor Ts2' is blocking, the transformer transmits its stored energy through the second winding WII' of the control transformer to the switching transistor TS' which then becomes conductive. The first winding WI', the second winding WII' and the third winding WIII' of the control transformer operate as a current converter, the part of the collector current of TS' corresponding to the transformation ratio now flowing as base current through the winding WII'.

If the control switching logic circuit SL generates a signal for turning off the switching transistor TS', the control transistor Ts2' becomes conductive and the transformer winding WIII' is short-circuited. As a result, only a very small voltage is present across the other windings WI', WII' and WIV' of the control transformer. No base current then flows in the switching transistor TS' causing it to become non-conductive and the charge carriers swept out from its base-emitter circuit by the capacitor C3. A parasitic capacitance Cp, which is produced, for example, by the winding capacitances or by capacitances intentionally added to remove radio interference, is always present in parallel with the primary winding WP of the power transformer Tr.

The secondary winding WS of the power transformer Tr is connected via a diode which rectifies the current flowing through this secondary winding WS to charging capacitor CL. The load resistance RL is connected in parallel with charging capacitor CL.

The series regulator LR, which is conventional comprises a series transistor, a zener diode connected between the base of the series transistor and ground, and a resistor in parallel with the collector-base path of the series transistor. The emitter of the series transistor is connected to switching logic circuit SL and to a smoothing capacitor C30, as well. Smoothing capacitor C30 provides a smoothed voltage for the switching logic circuit SL.

Supposing that transistor Ts2' is turned on, winding WIII' will be short-circuited. This short circuit is transformed to windings WII' and WIV', the charge carriers of switching transistor TS' being swept out by capacitor C3. The sweep out current through winding WII' is transformed to winding WIII' and causes a short-circuit current to flow through the emitter collector path of driving transistor Ts2'. The short-circuit current through driving transistor TS2' flows until all the charge carriers of switching transistor TS' are swept out. During the short circuit period winding WIV' is also short circuited and the current through winding WIV' is determind by resistor R34. The current Ist through winding WIV' is shown in FIG. 3, line e. If the sweep out current has ended, the short circuit current through winding WIII' also terminates. At the end of the short circuit internal energy is stored by means of a current through winding WIV'.

The feedback winding WIV in FIG. 1 corresponds to winding WI' of FIG. 4. Winding WI in FIG. 1 corresponds to winding WIV' in FIG. 4.

The resistor R21, diode Gr21 and capacitor C21 protect the switching transistor TS' against voltage peaks. This protective circuit is known from the publication "Schaltnetzteile" (Switching Network Components), by J. Wüstehube, published by Expert Verlag, Grafenau, 1979, page 81, FIG. 2.23. When switch S1 is closed, a current pulse flows through the capacitor Cp, the primary winding WI' of the control transformer, the diode Gr21 and the capacitor C21. This current pulse is transformed and generates a current corresponding to the transformation ratio in the winding WII' which causes the switching transistor TS' to become conductive. Because of the collector current feedback, the switching transistor TS' remains conductive until the control transistor Ts2' becomes conductive and shot-circuits the transformer via the winding WIII' causing the switching transistor TS' to become non-conductive.

The input voltage Ue may often change within a relatively broad range but it is necessary to keep the voltage for the logic circuit SL relatively stable. Accordingly, the control switching logic circuit SL is preferably fed by the series regulator LR. However, this has the disadvantage that after application of the input voltage, the supply voltage for the control circuit rises relatively slowly.

In order to prevent uncontrolled operation of the dc/dc converter when the supply voltage of the control switching logic circuit SL is too low, the control transistor Ts2' may be maintained in its conductive state thereby blocking the switching transistor TS'. However, this protection will not function until, after application of the input voltage Ue, the supply voltage for the logic circuit SL has risen to a value which permits actuation of the control transistor Ts2'. Consequently, after application of the input voltage, the control transistor TS2' can become conductive only after a predetermined delay and thus block the switching transistor TS'.

For that interval, the control transistor Ts2', which is switched on by a noise pulse, remains conductive. With longer delay times, the collector current of the switching transistor TS' can rise to unduly high values only after the input voltage Ue has been applied. When the delay times are too long, the power transformer Tr goes into saturation which can lead to the destruction of switching transistor TS'.

To prevent the switching transistor TS' from being actuated when the supply voltage for the control switching logic circuit SL is too low or even missing completely, the control stage SS' functions as a protective circuit. In this circuit, the control transistor Ts2' operates in combination with transistor Ts3' and resistors R6 and R7. When actuated by the logic circuit SL, stage SS' constitutes a simple switch and, without actuation from the control switching logic circuit, acts like a voltage controlled resistor which has a decreasing resistance as the voltage u1 at the emitter of transistor Ts2' increases.

When switch S1 is closed, a noise current pulse flows through the winding WI' of the transformer. This noise pulse is transformed and generates the voltage drop u1 in stage SS' which functions as a voltage controlled resistor. The voltage which is then present at the winding WIII' is transformed and generates at the winding WII' a low voltage corresponding to the transformation ratio. Resistor R7 has a value such that the transformed noise pulse generates a voltage u1 of a magnitude which causes the transformed voltage across the winding WII' to remain so small that the switching transistor TS' cannot be actuated.

Typical values for the components employed in the circuit of FIG. 4 are as follows.

| RG | = 200 Ω | R7 | = KΩ | R21 | = 10 KΩ |
|---|---|---|---|---|---|
| R32 | = 100 Ω | R34 | = 100 Ω | C3 | = 1 μF |
| C21 | = 0.15 μF | C30 | = 1 μF | Ue | = 12 V |
| WI' | = 4 turns | WII' | = 44 turns | WIII' | = 465 turns |
| WIV' | = 116 turns | | | | |

The values of the other components, transistors, etc. depend on the application of the dc/dc converter. As for the control logic circuit SL and the clock pulse generator CPG slightly modified versions of those illustrated in FIG. 5 can be used.

Figure 6:
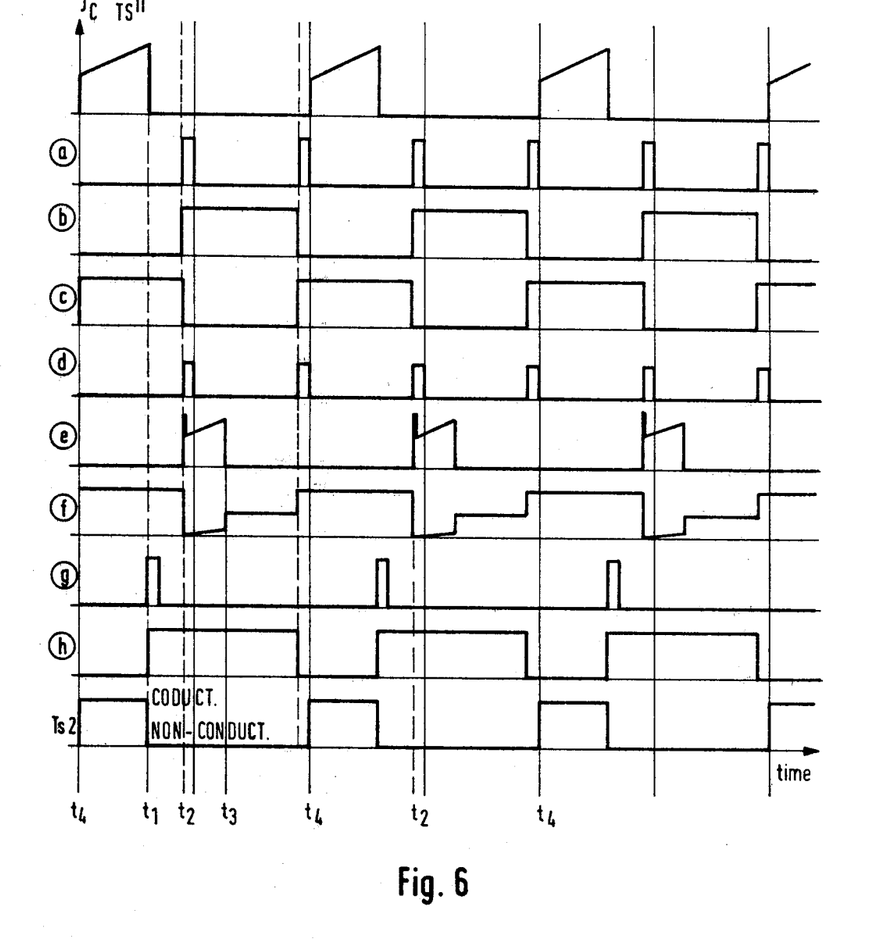
FIG. 6 shows current waveforms for the circuit diagram of FIG. 5.

FIG. 5 shows a circuit diagram similar to that of FIG. 1 wherein the control logic circuit SL and the clock pulse generator CPG are shown in detail. The waveform diagram of FIG. 6 illustrates the operation of the circuit.

The control logic circuit SL comprises a pulse-width modulator K1 which is actuated by the voltage at the load resistance RL and the current IcTS" through switching transistor TS". The output signal of pulse-width modulator K1 and the output signal of clock pulse generator CPG are connected to a logic gate circuit L, which via a comparator K3 controls driving transistor Ts2" at its base junction.

The voltage at the load resistance RL is fed via resistor R41 to a capacitor C41 which integrates this voltage, a resistor R51 being connected in series with capacitor C41. An auxiliary transformer with a primary winding wh1 in the current path of switching transistor TS" and a secondary winding wh2 supplies a signal to a capacitor C42, connected in parallel with resistor R51. Therefore a current is driven through resistor R51, which is proportional to the current IcTS". The sum resulting from the voltage at load resistor RL and the signal proportional to current IcTS", shown in the first line of FIG. 6, is fed to the pulse-width modulator K1 at its non inverting junction. If the voltage at load resistor RL increases, the current driven through resistor R51 decreases, because of a decrease of current IcTS"; therefore the sum signal at the non inverting junction of pulse-width modulator K1 is relatively constant. The inverting junction of the pulse-width modulator K1 is connected to a reference voltage source Uref2. If the sum signal at the non inverting junction point of K1 exceeds the reference voltage given by Uref2 the output of K1, shown in FIG. 6 line ⓖ, goes high, triggering flip-flop FF2 at its clock input. As the D input of flip-flop FF2, connected to the positive junction point of input voltage source Ue is high (positive voltage represents the 1 state) the non inverting output Q of flip-flop FF2 is high. The output signal Q, shown in FIG. 6 line ⓗ, is fed to OR-circuit L. The output of OR-circuit L is connected to the non inverting input of comparator K3. The inverting input of comparator K3 is connected to the reference voltage source Uref2. The output of comparator K3 is connected to the base junction of driving transistor Ts2". A high signal at the output Q of flip-flop FF2 exceeds the reference voltage given by Uref2. Therefore the output of comparator K3 generates a signal for turning on driven transistor Ts2". When control transistor TS2" becomes conductive the transformer winding WIII" is short-circuited. The short-circuit current is transformed to winding WII", so that switching transistor TS" becomes non conductive. The charge carriers from switching transistor TS" are removed by capacitor C11". The winding WIV" serves as a feedback winding and corresponds to winding WIV in FIG. 1.

Referring to the RC-clock pulse generator TG, it comprises a comparator K2. The non inverting input of comparator K2 is connected via a voltage divider consisting of resistors R48, R49, R44, and R47 to the input voltage source Ue. The inverting input of K2 is connected via a resistor R43 to the input voltage source Ue and via a capacitor C43 to ground. The output of comparator K2 is connected via a series circuit consisting of a diode and a resistor R50 to its inverting input and via resistor R47 to its non inverting input. The output of comparator K2 is connected to an inverter stage. The pulse train generated by RC-generator CPG is illustrated in FIG. 6, line ⓐ, the pulses generated by generator CPG beginning just before time t2 and ending at time t2. The output of the clock pulse generator (output of inverter stage) is connected to the clock input of flip-flop FF1 which operates as a frequency divider.

When the output pulse of clock pulse generator CPG behind the inverter stage rises, the output $\bar{Q}$ of flip-flop FF1 goes high, as shown in FIG. 6, line ⓑ and the output Q goes down (0 state), as shown in FIG. 6, line ⓒ. In FIG. 6, line ⓓ the inverted pulse train of clock pulse generator CPG is shown once more, but with a lower level, caused by resistor R46, diode D42 resistor R12", and reference voltage Uref1. This lower level pulse train is fed to the inverting junction of the bistable comparison amplifier V as a reset pulse train Rip. The inverting input of amplifier V is connected to a series connection of resistor R12" and Uref1. A pulse from clock pulse generator CPG causes a voltage at the inverting junction of amplifier V of about 8 volts (depending on the elements shown in FIG. 5, the values of which will be indicated later). This level of about 8 volts causes the output of amplifier V to be low, and a noise pulse superimposed on the current through Ts1", as shown in FIG. 6, line ⓔ at the edge of the current through Ts1", provided at a summing point leading by means of resistor R3" to the non inverting junction of amplifier V and winding WI", will be ineffective. At the end of a noise pulse the pulse supplied by clock pulse generator CPG will be off, so that at the inverting junction of amplifier V only the reference voltage source Uref1, connected via R12" to amplifier V is effective. If enough energy is stored the non inverting junction of amplifier V the voltage therefore is higher than at the inverting junction, which causes the output of the amplifier V to go high. If the output of amplifier V is high, transistor Ts1" becomes non-conductive and energy storage caused by the current through Ts1" and winding WI" is terminated. The stored energy is transferred by means of winding WIII" to the circuit of conductive transistor Ts2", so that winding WIII" is shortcircuited and energy storing with relatively low losses is possible.

Just before the time t4, shown in FIG. 6, the pulse generated by clock pulse generator CPG is high and the output $\bar{Q}$ of flip-flop FF1 is low, as shown in FIG. 6, line b. The output Q of flip-flop FF1 is high (FIG. 6, line c) and blocks the comparison amplifier V via diode D41, connected to the non inverting junction point of amplifier V. This causes transistor Ts1" to remain non conductive. The output $\bar{Q}$ of flip-flop FF1 goes to zero. The set junction S of flip-flop FF2 is at zero since output $\bar{Q}$ of flip-flop FF1 is connected to this set junction. At the reset junction R of flip-flop FF2 the pulse generated by clock pulse generator CPG is present. Therefore the output Q of flip-flop FF2 switches to low (FIG. 6, line h), the output of comparator K1 (FIG. 6, line g) is low and, at instant t4, the pulse generated by clock pulse generator CPG switches to low. All input junctions of OR-gate L are now low. The non inverting junction of comparator K3, being connected to the output of the OR-gate, is also low. The voltage at the inverting junction of comparator K3 (Uref2) now exceeds the voltage at the non inverting junction of comparator K3, causing the output of comparator K3 to switch to low. The base junction of transistor Ts2", connected to the output of comparator K3 is low, transistor Ts2" becomes non conductive and the stored energy of the control transformer turns on switching transistor TS" via winding WII".

Typical circuit values for the dc/dc converter of FIG. 5 are as follows:

| R1" = 16 Ω | R2" = 16 Ω | R3" = 51 KΩ |
|---|---|---|
| R4" = 51 KΩ | R11" = 4.3 KΩ | R12 = 10 KΩ |
| R13" = 4.3 KΩ | R41 = 3.6 KΩ | R42 = 10 KΩ |
| R43 = 100 KΩ | R44 = 6.8 KΩ | R45 = 51 KΩ |
| R46 = 5.1 KΩ | R47 = 3 KΩ | R48 = 20 KΩ |
| R49 = 10 KΩ | R50 = 5.1 KΩ | C11" = 47 μF |
| CL = 3300 μF | C41 = 0.22 μF | C42 = 39 nF |
| C43 = 470 pF | Ue = 12 V | WI" = 116 turns |
| WII" = 44 turns | WIII" = 465 turns | WIV" = 4 turns |
| Wh1 = 1 turn | Wh2 = 280 turns | |
| FF1 = FF2, e.g. 4013 B | | |
| K1 = K2 = K3, e.g. LM239 | | |

It will be understood that the above description of the present invention is susceptible to various modifications, changes and adaptations, and the same are intended to be comprehended within the meaning and range of equivalents of the appended claims.

What is claimed is:

1. The method of controlling a dc/dc converter including a first switching transistor having an emitter-collector circuit connected to a load, and a base circuit; a transformer having first, second and third electromagnetically coupled windings, the first winding of said transformer being coupled via a second switching transistor to an input voltage source and being selectively energized from said input voltage source, the second winding of said transformer being connected in the base-emitter circuit of said switching transistor, and the third winding of said transformer being coupled by a control stage to a control switching logic circuit controlled by the voltage across said load, the first, second and third windings of said transformer having polarities such that the first winding of said transformer is energized during the off time of said first switching transistor and said control switching logic circuit selectively energizes said first winding and short-circuits said third winding thereby determining the beginning and end of the conducting period of said first switching transistor, said method comprising the steps of:

(a) short-circuiting said third winding thereby causing the voltage across said second winding to decrease and switch said first switching transistor into its non-conducting state;

(b) energizing said first winding from said input voltage source during the off time of said first switching transistor;

(c) deenergizing said first winding after sufficient energy has been stored in the core of said transformer to actuate said first switching transistor; and (d) removing the short circuit from said third winding thereby causing the energy stored in said core to be transferred to said second winding and drive said switching transistor into its conducting state.

2. A dc/dc converter for controlling the current through a load, comprising:

a first switching transistor having an emitter, a base and a collector, the emitter-collector circuit of said first switching transistor coupling an input voltage source to said load;

a control transformer having first, second and third electromagnetically coupled windings, the second winding of said control transformer being connected in the base-emitter circuit of said switching transistor;

a control switching logic circuit for selectively generating pulses for determining the beginning and end of the conducting period of said switching transistor;

a control stage coupled to said control switching logic circuit for selectively short-circuiting said third winding thereby reducing the voltage across said second winding and driving said switching transistor into its non-conducting state, said control stage comprising a second switching transistor having its base connected to an output of said control switching logic circuit and its emitter-collector circuit connected across said third winding; and a charging control circuit for selectively energizing said first winding from said input voltage source and disconnecting said first winding from said source when sufficient energy has been stored in the core of said transformer to actuate said first switching transistor, said charging control circuit comprising a bistable comparison amplifier having inverting and non-inverting inputs and an output, said inverting input being coupled to an output of said control switching logic circuit and to a reference voltage source;

a second switching transistor having a base coupled to the output of said amplifier, an emitter and a collector;

a first resistor connecting one of said emitter and collector of said second transistor to one terminal of said input voltage source;

a second resistor having one end connected to the other terminal of said input voltage source, said first winding being connected between the other of the emitter and collector of said second transistor and the other end of said second resistor; and a third resistor connected between the junction of said first winding and said second resistor and the non-inverting input of said amplifier and a fourth resistor connecting the output of said amplifier to the non-inverting input thereof.

3. The dc/dc converter of claim 2 which further comprises a zener diode and a resistor coupled between the base of said second transistor and the junction of said first resistor and said one terminal of said input voltage source.

4. A dc/dc converter for controlling the current through a load, comprising:

first, second, and third switching transistors;

a power transformer having a primary and a secondary winding, said load being connected via a rectification element to said secondary winding;

a control transformer having first, second, third, and fourth windings;

a control stage including said second switching transistor, the third winding of said control transformer being connected by a rectification element to the emitter-collector circuit of said second transistor;

said third switching transistor having its base coupled to a control switching logic circuit, its collector to the base of said second transistor and its emitter to the collector of said second transistor, said control stage selectively short-circuiting the third winding of said control transformer thereby reducing the voltage across the second winding of said control transformer and driving said first switching transistor into its non-conducting state;

a first resistor coupled between the emitter and base of said second switching transistor; and a second resistor coupled between the emitter of said second transistor and the base of said third transistor;

means coupling the primary winding of said power transformer, the first winding of said control transformer and the emitter-collector circuit of said first switching transistor in series across an input voltage source; and a third resistor, said third resistor being coupled in series with the fourth winding of said control transformer and the emitter-collector circuit of said second switching transistor across said input voltage source, the first, second and third windings of said control transformer having a predetermined polarity and said fourth winding of said control transformer having a polarity which is opposite from that of said predetermined polarity.

* * * * *